_United States Patent_ [19]

Kanno et al.

[11] Patent Number: 6,155,058
[45] Date of Patent: Dec. 5, 2000

[54] CONTAINERIZED REFRIGERANT COMPRISING REFRIGERANT IN DISPOSABLE CONTAINER

[75] Inventors: Kiyomitsu Kanno; Kazumasa Yoshisaka, both of Tokyo, Japan

[73] Assignee: Showa Denko K.K., Tokyo, Japan

[21] Appl. No.: 09/030,226

[22] Filed: Feb. 25, 1998

[30] Foreign Application Priority Data

Apr. 10, 1997 [JP] Japan .................................. 9-092574

[51] Int. Cl.[7] .................................................. F17C 11/00
[52] U.S. Cl. ............................................. 62/45.1; 62/46.1
[58] Field of Search ..................................... 62/45.1, 46.1

[56] References Cited

U.S. PATENT DOCUMENTS

| | | | |
|---|---|---|---|
| 3,130,561 | 4/1964 | Hnilicka, Jr. | 62/45.1 |
| 3,147,877 | 9/1964 | Beckman | 62/45.1 |
| 4,154,364 | 5/1979 | Hagiwara et al. | 220/442 |
| 4,287,720 | 9/1981 | Barthel | 62/45.1 |
| 4,510,758 | 4/1985 | Tench, Jr. | 62/45.1 |
| 4,668,551 | 5/1987 | Kawasaki et al. | 428/69 |
| 5,408,832 | 4/1995 | Boffito et al. | 62/45.1 |
| 5,505,810 | 4/1996 | Kirby et al. | 428/69 |

FOREIGN PATENT DOCUMENTS

8-193762 7/1996 Japan ................................. F25B 1/00

_Primary Examiner_—Ronald Capossela
_Attorney, Agent, or Firm_—Sughrue, Mion, Zinn, Macpeak & Seas, PLLC

[57] ABSTRACT

In a containerized refrigerant comprising a refrigerant in a disposable container, wherein the refrigerant consists of a hydrogen-containing fluorocarbon, the disposable container 2 contains a solid adsorbent 4 together with the refrigerant 3 which consists of the hydrogen-containing fluorocarbon in order to prevent the purity of the refrigerant from being lowered and the container from being corroded during storage for a long time.

12 Claims, 2 Drawing Sheets

_CONTAINERIZED REFRIGERANT COMPRISING REFRIGERANT IN DISPOSABLE CONTAINER_

BACKGROUND OF THE INVENTION

1. Field of the Invention

The present invention relates to a containerized refrigerant comprising a refrigerant in a portable disposable container, which is used when a refrigerant is charged or recharged into a cooling apparatus such as an automobile air conditioner, a refrigerator, and a general air conditioner, and relates to a method for maintaining the purity of the refrigerant in the portable disposable container. In particular, the present invention relates to a containerized refrigerant comprising a refrigerant in a disposable container, by which problems such as degradation of the purity of the refrigerant and corrosion of the container during storage, which occurred in conventional containerized refrigerants comprising a hydrogen-containing fluorocarbon in a disposable container, are avoided for a long time, and also relates to a method for maintaining the purity of such a refrigerant.

This application is based on patent application No. Hei 9-92574 filed in Japan on Apr. 10, 1997, the content of which is incorporated herein by reference.

2. Description of Related Art

Conventionally, as refrigerants in cooling apparatuses and refrigerating apparatuses, dichlorodifluoromethane (commonly called CFC12), chiorodifluoromethane (commonly called HCFC22), and the like are widely used in large quantities. Particularly, in the field of automobile air conditioners (in-car air conditioners), since the amount of the refrigerant to be charged is relatively small, a containerized refrigerant in a small disposable can, such as a disposable can for a refrigerant having a volume of about 1 liter or less which is filled, for example, with CFC 12, is common on the market for recharging following leakage.

In the case, for example, of CFC12 used as a refrigerant for refrigerators and HCFC22 used as a refrigerant for air conditioners, on the other hand, since the initial charge or recharge amount is relatively large, the refrigerant is filled into strong portable refillable containers which have no welds or seams. Since these large portable containers are expensive to produce, after being used, as a general rule, they are returned to the refrigerant suppliers and are refilled to be used repeatedly. However, the rate of recovery of the containers has gradually declined, and it has become a factor in increasing the cost of the containerized refrigerants. Thus, recently, with respect to these large portable containers, attention is increasingly paid to inexpensive welded-type disposable portable containers having valves which do not allow refilling after use.

In recent years, the depletion of the ozone layer in the stratosphere by chlorofluorocarbons (commonly called CFCs) has been brought forward as a serious environmental problem, and the production of chlorofluorocarbons has been discontinued since the end of 1995. Therefore, at present, in the field of automobile air conditioners wherein CFC12 was conventionally used, the use of HFC134a ($CH_2FCF_3$) which is one of the hydrofluorocarbons (commonly called HFCs) has superseded the use of CFC12, and similarly, a containerized refrigerant made by filling HFC134a into a small disposable container is becoming common for use in recharging. Although the demand for containerized refrigerants for recharging of refrigerators that use HFC134a has increased, such containerized refrigerants have not yet been put into practical use since the long-term reliability of refrigerators requires a refrigerant of higher quality than that used for automobile air conditioners.

Further, with regard to the above HCFCs, although the deleterious effects on the ozone layer are less than those of CFCs, because of the possibility that the amount of HCFCs will increase due to their being alternatives to CFCs, abolition of the use of HCFCs in principle in 2020 was decided, and the international regulation of total emissions was begun in 1996. Therefore, as an alternative to HCFC22 which is widely used in air conditioners and the like, a refrigerant having an HFC component which falls outside the regulations and whose ozone depleting potential is zero is now being studied.

As a refrigerant composition that can replace HCFC22, there is no single refrigerant that can be used as-is in conventional apparatuses designed for HCFC22, and therefore two-component or three-component HFC-type mixed-refrigerants, the physical properties, etc., of which are adjusted by mixing several components, were developed. However, since most of these mixed refrigerants are non-azeotropic mixtures, these mixed refrigerants filled in a conventional large portable refrigerant container have the problem that during a recharging procedure, the proportions of the components in the mixture at initial dispensing differ from those at later dispensing. Thus, in order to solve this problem and maintain the cooling/refrigerating performance constant at all times, a disposable containerized refrigerant for recharging a high-quality refrigerant is required in which the high-quality refrigerant is containerized in an amount needed for one recharging.

Conventionally, for example, containerized refrigerants for recharging service using CFC12 which has been used for automobile air conditioners, or HFC134a which is currently being used, are charged into an air conditioner in an amount of between 200 and 300 g and are products that can be handled by general consumers. These containerized refrigerants are supplied on the market in small disposable cans which are mass-produced by rolling metal sheets, which costs less. The container of the containerized refrigerant has a structure by which the refrigerant may be dispensed by opening the can by screwing a separately-supplied exclusive-charge-valve into a threaded part of an upper part of the can to cause a built-in needle to pierce a lid plate of the can. After opening, the can cannot be used again.

The structure of the above disposable can is very simple, and when the can is filled with a refrigerant, a liquid refrigerant is generally filled into the can while an upper part of the can is open, and the can is sealed with a lid plate by staking them together ("staking" herein means "fitting the two parts together and causing a plastic flow at the joint"). Accordingly, even if the original refrigerant before filling is of a desirably high quality, in comparison to that in general welded-type portable refrigerant containers, the possibility that the quality is degraded by, for example, contamination with water and organic substances, such as oil components in the filling step, is high and cannot be avoided.

Figure 4:
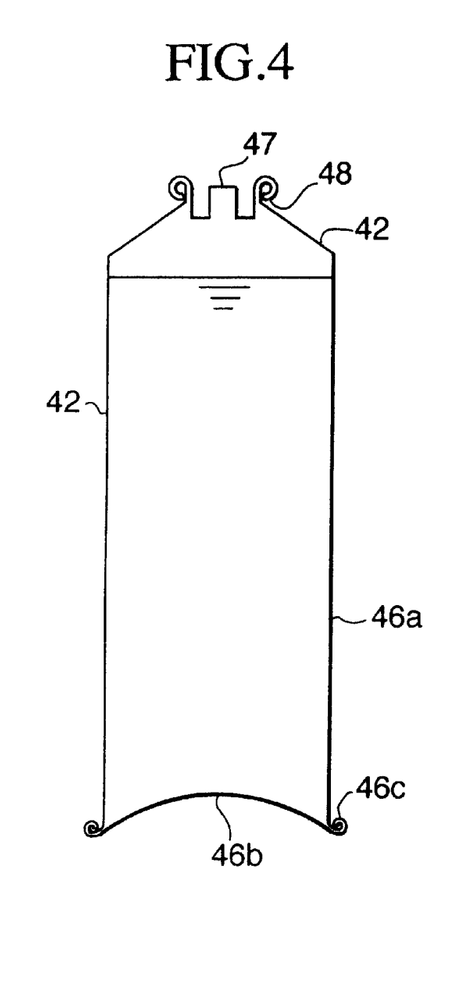
FIG. 4 is a cross-sectional view showing an embodiment of a conventional containerized refrigerant in a disposable container.

Further, as is shown in FIG. 4, the above disposable can comprises a disposable container body 42 wherein, in order to maintain the hermetic seal, an elastomer packing material 48 is used at at least the part where a lid plate 47 is joined to the disposable can body 42. Furthermore, in some cases, a sealant 46c, for example, of a resin compound is used at a joining part where a bottom plate 46b of the container body is joined to a cylindrical side plate 46a. The packing material 48 and sealant 46c are in contact with the refrigerant for a long time during storage of the containerized refrigerant, and therefore dissolving of organic substances, such as plasticizers, into the refrigerant, thereby increasing the evaporation residue of the refrigerant over time cannot be avoided. Therefore, as the quality standard of conventional refrigerants for recharging automobile air conditioners, the allowable value of the evaporation residue is set to be, for example, 100 ppm by weight or less, which is a relatively lenient value.

Further, during storage of the above containerized refrigerant, particularly when the humidity in the air is high, such as in summer, the following phenomenon is known: in addition to the osmotic pressure of moisture, breathing action due to a change in the internal vapor pressure caused by a change in the temperature of the air allows moisture to penetrate, for example, through the packing material and the seal thereby allowing the moisture concentration of the refrigerant to increase over time, leading to the problem that the quality of the contained refrigerant is inevitably degraded, limiting product life. Therefore, the quality standard for conventional refrigerants for recharging automobile air conditioners restricts the moisture content to 50 ppm by weight or less. It is known that since HCFCs and HFCs contain hydrogen atoms in their molecules, they are particularly high in hygroscopicity in comparison with conventional CFCs.

Further, it is also known that moisture contained in a refrigerant in contact with the metal of a can for a long period of time causes the refrigerant to gradually hydrolyze to produce inorganic acids, such as HCl and HF, thereby not only degrading the quality of the refrigerant, but also possibly causing corrosion or leakage of the can. Accordingly, acid components are also restricted conventionally by the quality standard and are set to 1 ppm or less by weight, which will generally not result in corrosion or the like.

With respect to containerized refrigerants for recharging domestic appliances such as domestic refrigerators and indoor air conditioners, the quality standards are even more stringent to ensure long-term reliability; for example, the moisture is set to be 20 ppm by weight or less, the acid content is set to be 0.2 ppm by weight or less, and the evaporation residue consisting of at least one of the oil content and the organic substance content is set to be 20 ppm by weight or less. Hence, the above small disposable canned refrigerant for recharging automobile air conditioners cannot satisfy the standards for these type of domestic appliances.

As a containerized refrigerant for recharging domestic appliances, one is known in which a refrigerant is contained in a relatively large welded-type disposable portable container having a volume of about 45 liters or less. Although this is widely used not only for recharging but also for initial charging in a production line for refrigerating apparatuses, due to the disposable nature of the container, the material used therein must be inexpensive while meeting minimum specifications and must have a valve structure which physically blocks refilling. This valve has a non-returning float inserted therein. The float is placed at an upper part of the container to allow filling only when the refrigerant is initially filled into the container; after closing the main valve, the float remains lowered, and from then on the dispensing of the refrigerant is made possible only by opening the main valve to generate a pressure difference between the inside and the outside to allow the float to be raised; refilling from the outside is never possible because the inner float is in the closed state. Although in the case of general reusable portable containers, special attention is paid to the sealant or the like for the valve, in the case of disposable containers, inexpensive resin sealant are used and the problem of the sealing properties of the structure of the container remains unsolved. Further, the relatively large welded-type disposable portable containerized refrigerant has a problem in that the purity of the refrigerant is degraded due to increases in moisture, acid content, organic evaporation residue, and the like in the refrigerant for the same reasons as in the above small disposable containerized refrigerant for recharging.

SUMMARY OF THE INVENTION

The present invention has been made to solve the above problems, and it is an object of the present invention to provide a containerized refrigerant comprising a refrigerant in a disposable container wherein when a hydrogen-containing fluorocarbon is to be used as the refrigerant, the quality of the containerized refrigerant in a small disposable can or a disposable portable container for recharging can be maintained in a highly pure state for a long period of time by relatively simple means. It is also an object of the invention to provide a method for maintaining the purity of a refrigerant in the container.

The present invention provides, as a means of attaining the above objects, a containerized refrigerant in a disposable container, wherein the disposable container contains a solid adsorbent together with the refrigerant which consists of a hydrogen-containing fluorocarbon. Preferably, in the refrigerant contained in the disposable container, moisture is maintained at 20 ppm by weight or less, acid content is maintained at 0.2 ppm by weight or less, and organic evaporation residue is maintained at 20 ppm by weight or less. The refrigerant is preferably selected from hydrofluorocarbons and hydrochlorofluorocarbons. The solid adsorbent preferably comprises at least one adsorbent selected from the group consisting of a silica adsorbent, an alumina adsorbent, and a silica-alumina-type adsorbent having a framework structure comprising silica and alumina. In addition, the solid adsorbent is preferably a solid adsorbent containing a carbon-type adsorbent together with a silica-alumina-type adsorbent.

The solid adsorbent is preferably contained in a refrigerant-permeable bag. Preferably, a refrigerant-permeable filter is attached to a refrigerant discharge port of the container.

The present invention also provides a method for maintaining the purity of a refrigerant contained in a disposable container wherein by containerizing a solid adsorbent together with the refrigerant which consists of a hydrogen-containing fluorocarbon in the disposable container, moisture is maintained at 20 ppm by weight or less, acid content is maintained at 0.2 ppm by weight or less, and organic evaporation residue is maintained at 20 ppm by weight or less in the refrigerant.

Since in the containerized refrigerant comprising a refrigerant in a disposable container according to the present invention, the disposable container contains a solid adsorbent together with the refrigerant which consists of a hydrogen-containing fluorocarbon, there is not only an effect of removing impurities introduced at the time of the initial filling but also an effect of removing impurities produced over time, and therefore the concentrations of impurities in the filled refrigerant can be kept low for a long period of time. Thus a refrigerant having a high purity, which cannot be realized by conventional containerized refrigerants in disposable containers, can be easily provided.

DESCRIPTION OF THE PREFERRED EMBODIMENTS

Hereinbelow, modes of the present invention are described based on embodiments with reference to the drawings.

Example 1

Figure 1:
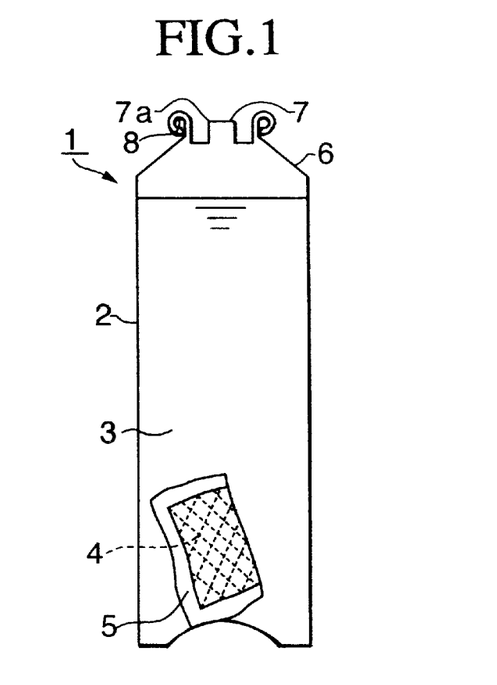
FIG. 1 is a cross-sectional view showing an embodiment of the present invention.

FIG. 1 shows an embodiment of the present invention. In FIG. 1, the containerized refrigerant 1 in a disposable container according to the present invention (hereinafter referred to as "the present containerized refrigerant") comprises a disposable container 2 containing a solid adsorbent 4 together with a refrigerant 3 which consists of a hydrogen-containing fluorocarbon.

The disposable container 2 is an aluminum can having an internal volume of 300 ml and comprises two pieces, a container body 6 and a lid member 7. A top opening of the container body 6 and the lid member 7 are joined hermetically by a staking process with a packing material 8 of a nitrile-butadiene rubber (NBR) therebetween. The disposable container 2 is filled with 250 g of HFC134a as a refrigerant 3. The solid adsorbent 4 contained in the disposable container 2 together with the refrigerant 3 is a granular molecular sieve ("MOLECULAR SIEVE XH-9", manufactured by Union Showa Co.) in an amount of 3 g and is confined in a refrigerant-permeable paper bag 5.

Since the present containerized refrigerant 1 comprises the disposable container 2 containing the solid adsorbent 4, and the solid adsorbent 4 is constantly in contact with the refrigerant 3 through the refrigerant-permeable paper bag 5, the moisture introduced concomitantly from the source of the refrigerant, the moisture introduced unintentionally during the filling operation, the moisture which penetrated through the joined part of the can during storage, the organic evaporation residue such as a plasticizer dissolved out of the packing material, the acid components produced by prolonged contact of the refrigerant with water, and the like are adsorbed onto the solid adsorbent 4. Thus, for example, even if the present containerized refrigerant 1 is stored in a room for a year at a temperature of 40° C. and a relative humidity of 60%, moisture is maintained at 20 ppm by weight or less, acid content is maintained at 0.2 ppm by weight or less, and organic evaporation residue is maintained at 20 ppm by weight or less, so that the high purity of the refrigerant can be maintained for a long time and the inner wall of the disposable container 2 can be protected from corrosion.

In a manner similar to that used for the conventional containerized refrigerant in cans for recharging service, when the present containerized refrigerant 1 is to be used, an exclusive charge valve (not shown) is screwed into a molded threaded section 7a projected at the center of the lid member 7 to cause a needle built in the charge valve to pierce and open the lid plate at the top of the threaded section 7a so that the refrigerant can be dispensed. At that time, since the solid adsorbent 4 is confined in the paper bag 5, the solid adsorbent 4 does not flow out together with the refrigerant 3.

Example 2

Figure 2:
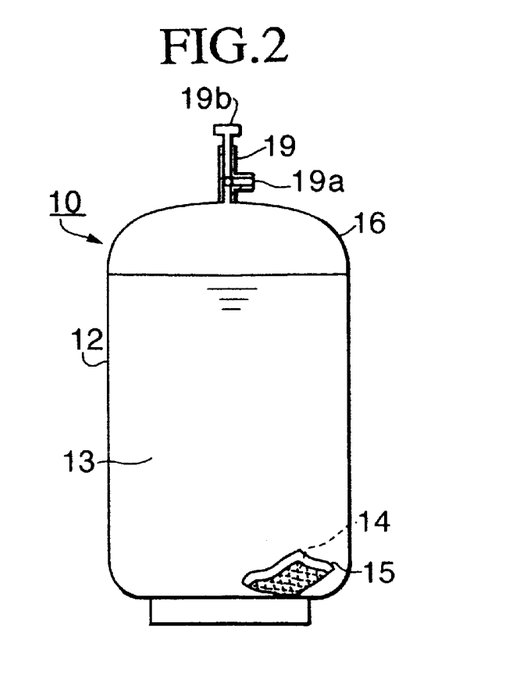
FIG. 2 is a cross-sectional view showing another embodiment of the present invention.

FIG. 2 shows another embodiment of the present invention. In FIG. 2, the present containerized refrigerant 10 comprises a portable disposable container 12 made by welding an iron plate, having an internal volume of 11.9 liters, the portable disposable container 12 containing a solid adsorbent 14 together with a refrigerant 13 which consists of a hydrogen-containing fluorocarbon.

The disposable container 12 has a valve 19 with a refilling-preventive function at the top of a container body 16 to permit initial filling but not to permit refilling. The disposable container 12 is filled with 10 kg of HFC134a as a refrigerant 13. The solid adsorbent 14 contained in this disposable container 12 is a mixture of 10 g of a granular molecular sieve ("MOLECULAR SIEVE XH-9", manufactured by Union Showa Co.) and 10 g of powdered activated coconut shell charcoal, the mixture being contained in a refrigerant-permeable paper bag 15.

Since the present containerized refrigerant 10 comprises the disposable container 12 containing the solid adsorbent 14 in a paper bag, the solid adsorbent 14 consisting of the molecular sieve and activated coconut shell charcoal, the moisture introduced concomitantly from the source of the refrigerant 13, the moisture introduced unintentionally during the filling operation, the moisture which penetrated through the joined part of the container and the valve and the like during storage, and the acid components produced by prolonged contact of the refrigerant with water, are adsorbed mainly onto the molecular sieve of the solid adsorbent 14 and the organic evaporation residue, such as a lubricant adhered to the valve 19 with a refilling-preventive function is adsorbed mainly onto the activated coconut shell charcoal. Thus, moisture is maintained at 20 ppm by weight or less, acid content is maintained at 0.2 ppm by weight or less, and organic evaporation residue is maintained at 20 ppm by weight or less for a long time, so that the high purity of the refrigerant can be maintained and the inner wall of the disposable container 12 can be protected from corrosion.

In a manner similar to that used for conventional containerized refrigerant in portable containers, when the present containerized refrigerant 10 is to be used, a discharge port 19a of the valve 19 with a refilling-preventive function is connected to a refrigerant receiving port of a cooling/refrigerating apparatus, and the valve is opened by rotating a handle 19b, so that the refrigerant can be dispensed. At that time, since the solid adsorbent 14 is confined in the paper bag 15, the solid adsorbent 14 does not flow out together with the refrigerant 13.

Example 3

Figure 3:
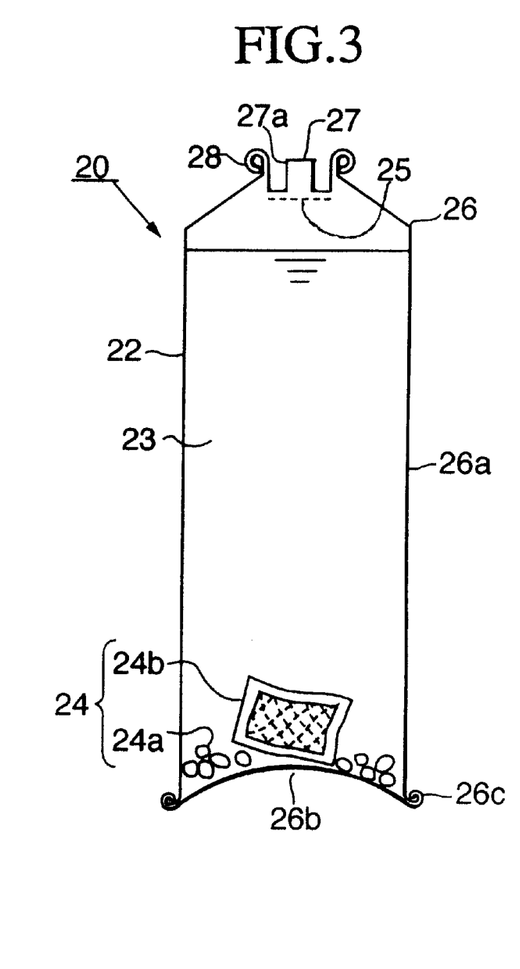
FIG. 3 is a cross-sectional view showing yet another embodiment of the present invention.

FIG. 3 shows yet another embodiment of the present invention. In FIG. 3, the present containerized refrigerant 20 comprises a disposable container 22, which is a can made of a tin-electroplated iron plate (tin plate), having an internal volume of 1,000 ml, the disposable container 22 containing a solid adsorbent 24 together with a refrigerant 23 which consists of a hydrogen-containing fluorocarbon.

This disposable container 22 comprises a container body 26 and a lid member 27, and the container body 26 comprises a barrel section 26a and a bottom section 26b that are joined by a staking process with a resin compound sealant 26c placed between these sections. The container body 26 and the lid member 27 are hermetically joined by a staking process with a packing material 28 of NBR placed therebetween. Further, the container body 26 has a 200-mesh metal gauze 25 soldered to the undersurface of the lid member 27.

The disposable container 22 is filled with 1 kg of R-407C as a refrigerant. Herein, "R-407C" refers to a 23/25/52 wt. % mixture of HFC32 ($CH_2F_2$)/HFC125 ($CHF_2CF_3$)/HFC134a ($CH_2FCF_3$). The disposable container 22 contains together with the refrigerant 23 a solid adsorbent 24 comprising 5 g of a granular molecular sieve 24a ("MOLECULAR SIEVE XH-9", manufactured by Union Showa Co.) and powdered activated coconut shell charcoal 24b (5 g) in a paper bag.

Since the present containerized refrigerant 20 comprises the disposable container 22 containing the solid adsorbent 24 which consists of the molecular sieve 24a and the activated coconut shell charcoal 24b, the moisture introduced concomitantly from the source of the refrigerant 23, the moisture introduced unintentionally during the filling operation, the moisture which penetrated through the joined part of the container during storage, the acid components produced on the container wall of the tin plate by prolonged contact of the refrigerant with water, and the like are adsorbed mainly onto the molecular sieve 24a of the solid adsorbent 14, and the organic evaporation residue dissolved out of the sealant 26c, the packing material 28, and the like into the refrigerant 23 is adsorbed mainly onto the activated coconut shell charcoal. Thus, moisture is maintained at 20 ppm by weight or less, acid content is maintained at 0.2 ppm by weight or less, and organic evaporation residue is maintained at 20 ppm by weight or less for a long time, so that the high purity of the refrigerant can be maintained and the inner wall of the disposable container 22 made of an inexpensive material can be protected from corrosion.

In a manner similar to that used for conventional containerized refrigerant in cans for recharging service, when the present containerized refrigerant 20 is to be used, an exclusive charge valve (not shown) is screwed into a molded threaded section 27a projected at the center of the lid member 27 and is then closed and a needle built in the charge valve is caused to pierce and open the lid plate at the top of the threaded section 27a, so that the refrigerant can be dispensed. At that time, since the molecular sieve 24 that is a solid adsorbent is checked by the metal gauze 25, the molecular sieve 24 does not flow out together with the refrigerant 23. Further, since the powdered activated coconut shell charcoal 24b is confined in a paper bag, the powdered activated coconut shell charcoal 24b does not flow out together with the refrigerant 23.

Hereinbelow, the constitutional elements of the present invention are described in detail.

The container used in the present invention is of a type that allows the filled refrigerant to be consumed generally at a time or by several times and is generally a small can of 1 liter or less for recharging or a portable disposable container of 45 liters or less.

Herein, the term "small can" means generally a disposable container of 1 liter or less made of a thin metal sheet used, for example, for recharging for automobile air conditioners, and generally the small can is of a two-piece type comprising the container body 6 and the lid member 7 as shown in FIG. 1 or of a three-piece type comprising the container barrel section 26a, the bottom section 26b, and the lid member 27 as shown in FIG. 3. Generally the small can does not have a valve mechanism and the pieces are joined via at least one of a rubber packing and a resin compound in an airtight manner to form a closed system.

This small can is formed with the bottomed cylindrical threaded section extended at the center of the lid member. When the refrigerant is to be dispensed, the threaded section is screwed into a charge valve connected to a refrigerant receiving port of a cooling/refrigerating apparatus, and after the charge valve is screwed in to cause the needle built therein to pierce the lid plate at the top of the threaded section, the container is turned upside down and the charge valve is loosened, so that the refrigerant is supplied to the cooling apparatus by the internal pressure.

On the other hand, the portable disposable container is larger in capacity than the above small can and is mainly used for initial charging or recharging for domestic refrigerators and domestic air conditioners. This disposable container has a capacity of 45 liters or less and is widely used not only for recharging but also for line charging of refrigerating apparatus. Due to the disposable nature of the container, the container must meet minimum specifications while the material used therein must be inexpensive, and generally the container has a valve structure which physically blocks refilling. The valve mechanism has a float inserted therein that serves as a non-returning valve. Only at the time of initial filling of a refrigerant, the float placed in an upper part of the valve allows the filling, but after the filling and the closing of the main valve, the float is lowered, and thereafter only when the main valve is opened, the pressure difference between the inside and the outside allows the float to be elevated to permit the refrigerant to be dispensed, and even if an attempt is made to carry out filling from the outside, the closed float placed inside will prevent the refilling.

The refrigerant to be filled into the disposable container is one selected from the group consisting of hydrogen-containing fluorocarbons, particularly hydrofluorocarbons and hydrochlorofluorocarbons, which may be used singly or as a mixture thereof.

As examples of the hydrofluorocarbons (HFCs), there can be mentioned HFC23 ($CHF_3$), HFC32 ($CH_2F_2$), HFC41 ($CH_3F$), HFC134 ($CHF_2CHF_2$), HFC134a ($CH_2FCF_3$), HFC143a ($CH_3CF_3$), HFC125 ($CHF_2CF_3$), HFC152a ($CH_3CHF_2$), HFC161 ($CH_3CH_2F$), HFC227ea ($CF_3CHFCF_3$), HFC227ca ($CHF_2CF_2CF_3$), HFC236ca ($CHF_2CF_2CHF_2$), HFC236cb ($CH_2FCF_2CF_3$), HFC236ea ($CHF_2CHFCF_3$), HFC236fa ($CF_3CH_2CF_3$), HFC245ca ($CH_2FCF_2CHF_2$), HFC245cb ($CH_3CF_2CF_3$), HFC245fa ($CHF_2CH_2CF_3$), and HFC254cb ($CH_3CF_2CHF_2$).

As examples of the hydrochlorofluorocarbons (HCFCs), there can be mentioned HCFC22 ($CHClF_2$), HCFC123 ($CHCl_2CF_3$), HCFC124 ($CHClFCF_3$), HCFC141b ($CH_3CCl_2F$), HCFC142b ($CH_3CClF_2$), HCFC225ca, ($CHCl_2$—$CF_2$—$CF_3$), and HCFC225cb ($CHClF$—$CF_2$—$CClF_2$).

As preferable examples of the hydrogen-containing fluorocarbon refrigerant for practical use to be filled into the disposable container, there can be mentioned HFC134a; a mixed refrigerant made up of at least two components selected from the group consisting of HFC134a, HFC125, HFC143a, and HFC32; HCFC22; and HCFC141b.

As specific examples of the above mixed refrigerant, there can be mentioned R-407C (HFC32/HFC125/HFC134a =23/25/52% by weight), R-410A (HFC32/HFC125=50/50% by weight), R-507A (HFC125/HFC143a=50/50% by weight), and R-404A (HFC125/HFC143a/HFC134a=44/52/4% by weight).

Impurities that may be mixed unintentionally in these hydrogen-containing fluorocarbons at the time when they are filled into disposable containers are moisture, acid components, organic components (oil components), and the like originated from the raw material, i.e., contained in the original refrigerant to be filled; moisture, organic components, and the like that will be mixed unintentionally into the container in the filling step; organic components, such as a plasticizer oozed from the resin, the packing material, and the like constituting the container during storage of the containerized refrigerant after the filling and sealing of the refrigerant; moisture which penetrated from the outside into the container during storage of the containerized refrigerant; and acid components produced or increased by the decomposition of the refrigerant due to the long coexistence of the refrigerant and moisture. Out of these, oil components that will be introduced unintentionally in the filling step are paraffinic mineral oils, naphthenic mineral oils, and AB (alkylbenzene oils), and synthetic oils, such as POE (polyol ester oils), PAG (polyalkylene glycol oils), PC (polycarbonate oils), and PVE (polyvinyl ether oils), and in addition to the oil components, organic components may include plasticizers contained, for example, in a distribution hose for the injection of the refrigerant, such as DOP (dioctyl phthalate) and N-n-butylbenzenesulfonamide. The plasticizer which may ooze out of the sealant, the packing material, etc., constituting the container, and which may dissolve into the refrigerant, includes esters such as DOP.

In the present containerized refrigerant in a disposable container, these impurities are removed by adsorption to the solid adsorbent. To select the solid adsorbent to be contained in the container, from an economic point of view, preferably a relatively small amount of one or at most two solid adsorbents is used to remove or reduce the above impurities. For this purpose, it is required that the types and the amounts of impurities to be removed, the concentrations thereof to be achieved, and the adsorption properties of various solid adsorbents be taken into consideration and that a combination of solid adsorbents and amounts thereof be determined.

Preferably, the solid adsorbent that can be used in the present invention comprises, in particular, at least one adsorbent selected from the group consisting of a silica adsorbent, an alumina adsorbent, and a silica-alumina-type adsorbent having a framework structure comprising silica and alumina. As examples of these adsorbent, there can be mentioned silica gels, activated aluminas, zeolites comprising silica and alumina. Out of these, for example, silica gels and activated aluminas can be used effectively in the case where moisture at a relatively high concentration may be removed to a level within a relatively moderate tolerance limit, but in order to keep moisture to a lower level, a synthetic zeolite having a specified pore diameter known as "a molecular sieve" can be preferably used as the solid adsorbent in the present invention. Since molecular sieves are higher in equilibrium moisture adsorption capacity than other solid adsorbents, they not only exhibit an excellent water adsorption ability even when used in a small amount, but also have an ability of removing acid components, such as HCl and HF similarly to activated aluminas and the like. Further, it has been confirmed by the experiments carried out this time that molecular sieves also exhibit an effect of removing organic components, such as plasticizers. Molecular sieves are commercially available as "MOLECULAR SIEVE (trade name)," for example, and therefore are readily obtained.

As other solid adsorbents, ion exchange resins, high-polymer-type dehydrating agents, and the like may be used, but their use is less preferable since there is possibility that some of them dissolve in hydrogen-containing fluorocarbons or give off low-molecular-weight substances.

In order to enhance the adsorption ability, preferably, said solid adsorbent comprises at least one carbon-type adsorbent together with at least one adsorbent selected from the group consisting of a silica adsorbent, an alumina adsorbent, and a silica-alumina-type adsorbent having a framework structure comprising silica and alumina. As examples of the carbon-type adsorbent, there can be mentioned activated carbons, molecular sieving carbons, etc., manufactured from various raw materials by various methods.

The pore diameter distribution of activated carbons ranges widely from 10 to 10,000 angstroms, and they can adsorb widely from low-molecular-weight substances to high-molecular-weight substances and are excellent in removing non-polar saturated organic substances. That is, the ability of activated carbons to adsorb moisture and acid components is inferior to that of the above molecular sieves, but the ability of activated carbons to adsorb organic substances, such as oils, is superior to that of the above molecular sieves. Therefore, the solid adsorbent in the present invention preferably comprises an activated carbon excellent in adsorptivity for organic substances together with a synthetic zeolite excellent in adsorptivity for moisture and acid components; the synergistic effect of the synthetic zeolite and the activated carbon can increase strikingly the effect of reducing impurities in refrigerants.

As the activated carbon, one having a wide pore diameter distribution, such as activated coconut shell charcoal, wood charcoal, petroleum-based activated carbons, and coal-based activated carbons, can be preferably used. Further, one whose pore diameter distribution is adjusted to a certain range, called a molecular sieving carbon, can also be used.

The amount of the solid adsorbent to be used is not particularly restricted and is determined, for example, by the amounts of impurities in the refrigerant or the rate of penetration of impurities, if penetrated, from the outside and the guaranteed period, but since the excessive use thereof is not economical, the amount of the solid adsorbent is generally 5% by weight or less based on the amount of the refrigerant filled, which range exhibits its effect fully.

The solid adsorbent may be, for example, in the form of a powder, granules, or pellets, or of a core-type wherein the solid adsorbent is mixed with a binder and is solidified, but in order to increase the surface in contact with the refrigerant to increase the adsorption rate, a powder, granules, pellets, or the like is preferable. However, when the refrigerant is dispensed from the container, since the mixing of the refrigerant with the solid adsorbent must be avoided, it is required to take measures to prevent the solid adsorbent from flowing out.

As one means of preventing the solid adsorbent from flowing out, there is a method wherein the solid adsorbent is placed in a refrigerant-permeable bag. The bag may be any one that is made, for example, of paper, cloth, or non-woven fabric, allows the refrigerant to flow freely into and out of the bag, and can prevent the solid adsorbent from leaking. As other means of preventing the solid adsorbent from flowing out, there is a method wherein the refrigerant discharge port of the container is equipped with a refrigerant-permeable filter. The filter may be made, for example, of paper, cloth, or metal gauze and, in particular, is preferably a metal gauze of suitable mesh welded or soldered to the inside of the refrigerant discharge port of the container.

According to the present invention, the refrigerant and the solid adsorbent are in a state where they are constantly in contact with each other in the container. For example, in the case wherein as an adsorbent a molecular sieve for removing moisture is confined in a small container for recharging of HFC134a, the process of the adsorption is such that the molecules of HFC134a are adsorbed on the surfaces of macropores of the molecular sieve, water molecules attending the HFC134a molecules diffuse through the macropores into micropores where the water molecules are adsorbed, and the moisture concentration on the adsorbent surface and the moisture concentration in the adsorbent become stable in equilibrium in the concentration balance determined by the adsorption equilibrium at that temperature.

Herein, the overall adsorption rate of water molecules is controlled by the slower one of the diffusion rate of water molecules onto the surfaces and the diffusion rate into the pores, driven by the forces due to the difference in concentration of moisture. Under natural convection conditions under which a solid adsorbent is allowed to stand in a refrigerant as in the present invention, the surface diffusion also affects the adsorption rate. In the present invention, as described above, since the refrigerant is constantly in contact with a prescribed amount of the solid adsorbent in the container, initially-mixed impurities can be in contact with the solid adsorbent for a sufficiently long time in comparison with a general industrial dehydration treatment; furthermore impurities which penetrate after the filling are adsorbed at a rate higher than the rate of the penetration, so that the impurity concentration is gradually lowered and the concentration of the impurities can be finally maintained at a very low level.

The containerized refrigerant in a disposable container according to the present invention is used after storing for a certain period of time after the production in view of the state of the distribution of the market for the containerized refrigerant even if the container is a small can or a portable disposable container; therefore, the contact time of the refrigerant and the solid adsorbent can be satisfactorily ensured, and since substantial stirring and mixing are effected satisfactorily during the transportation and handling, a state of the adsorption equilibrium can be attained relatively quickly.

Now, with respect to a variety of the present containerized refrigerants, Test Examples are shown wherein changes in the quality of refrigerants contained in containers over time were followed. For comparison, similar tests were carried out with respect to solid-adsorbent-free refrigerants contained in disposable containers.

Test Example 1

A hundred samples of the present containerized refrigerants 1 of the embodiment shown in FIG. 1 were produced. The disposable container 2 used was a two-piece type small can of aluminum having a capacity of 300 ml wherein the top opening of the container body 6 and the lid member 7 were hermetically joined by a staking process with the packing material 8 of NBR therebetween. The container was filled with 250 g of HFC134a as the refrigerant 3. As the solid adsorbent 4, a granular molecular sieve ("MOLECULAR SIEVE XH-9", manufactured by Union Showa Co.) was confined in an amount of 3 g in the paper bag 5.

All of the present containerized refrigerants 1 were stored with them upright in a test chamber wherein the air was conditioned to have a temperature of 40° C. and a relative humidity of 60%, 10 of them were taken out each time over the course of time, and changes in quality of the contained refrigerants 3 were followed. Each sample was taken from each of the refrigerants 3 by applying an exclusive charge valve (not shown) to the threaded section 7a molded to extend from the center of the lid member 7, placing the container upside down, and opening the container to allow the contents to flow out.

The evaluated characteristics were the moisture, the evaporation residue, the acid content, and the appearance of the refrigerant discharged. The moisture was analyzed by the Karl Fischer's method. The measurement of the evaporation residue was based on the weight method. The evaporation residue was qualitatively analyzed by FT-IR, and it was found that the main component was DOP. The acid content was analyzed by extracting with water, subjecting the extract to ion chromatography, and calculating the acid content in terms of Cl ions and F ions, the detection limit being 0.1 ppm by weight. The results (in average values) of the measurements are shown in Table 1.

Test Example 2

Test Example 1 was repeated, except that as the solid adsorbent, a mixture of 2 g of a granular silica gel and 3 g of a granular activated alumina was placed in a paper bag, thereby producing 100 samples of the present containerized refrigerants each of which was in a 300-ml small can. In the same way as in Test Example 1, changes in quality over time were followed. The results of the measurements are shown in Table 1.

Comparative Example 1

Test Example 1 was repeated, except that the solid adsorbent was not used at all, thereby producing 100 containerized refrigerants each of which was in a 300-ml small can. In the same way as in Test Example 1, changes in quality over time were followed. The results of the measurements are shown in Table 1.

The analysis by FT-IR found that in Comparative Example 1, the main component of the evaporation residue of the sample initially taken out was N-n-butylbenzenesulfonamide, and the main component increased thereafter was DOP.

TABLE 1

|  | Refrigerant | | | Adsorbent | | |
| --- | --- | --- | --- | --- | --- | --- |
|  | Type | Amount | Container | Type | Amount | Method |
| Test Example 1 | HFC134a | 250 g | 2-piece 300 ml | molecular sieve | 3 g | bagged |
| Test Example 2 | HFC134a | 250 g | 2-piece 300 ml | mixture of: activated alumina silica gel | 3 g 2 g | bagged |
| Comparative | HFC134a | 250 g | 2-piece | none | | |

TABLE 1-continued

| Example 1 | | 300 ml | | |
|---|---|---|---|---|
| | Analyzed (ppm by wt.) | Immediately after production | After 1 month | After 1 year |
| Test Example 1 | moisture | 9 | 5 | 1 |
| | evaporation residue | 15 | 8 | 7 |
| | acid content | <0.1 | <0.1 | <0.1 |
| | appearance | colorless transparent | colorless transparent | colorless transparent |
| Test Example 2 | moisture | 11 | 6 | 4 |
| | evaporation residue | 25 | 10 | 3 |
| | acid content | <0.1 | <0.1 | <0.1 |
| | appearance | colorless transparent | colorless transparent | colorless transparent |
| Comparative Example 1 | moisture | 14 | 24 | 65 |
| | evaporation residue | 21 | 26 | 83 |
| | acid content | <0.1 | <0.1 | 0.4 |
| | appearance | colorless transparent | colorless transparent | colorless transparent |

Test Example 3

One sample of the present refrigerant product 10 shown in FIG. 2 was produced. The container 12 used was a portable disposable container having an internal volume of 11.9 liters made of a welded iron plate. The container 12 was filled with 10 kg of HCl134a as the refrigerant 13. As the solid adsorbent 14, a mixture of 10 g of a granular molecular sieve ("MOLECULAR SIEVE XH-9", manufactured by Union Showa Co.) and 10 g of granular activated coconut shell charcoal confined in the paper bag 15 was used. After the bag 15 was placed in the container from the top opening of the container body 16, the valve 19 equipped with a refilling-preventive function was attached.

The containerized refrigerant was stored under the same conditions as those in Test Example 1 and changes in quality of the refrigerant were followed by taking samples over time. The results of the measurements are shown in Table 2.

Comparative Example 2

Test Example 3 was repeated, except that the solid adsorbent was not used at all, thereby producing a containerized refrigerant of Comparative Example 2 in a disposable container. In the same way as in Test Example 3, changes in quality over time were followed. The results of the measurements are shown in Table 2.

TABLE 2

| | Refrigerant | | | Adsorbent | | |
|---|---|---|---|---|---|---|
| | Type | Amount | Container | Type | Amount | Method |
| Test Example 3 | HFC134a | 10 kg | welded 11.9 liter | mixture of: molecular sieve activated coconut shell charcoal | 10 g 10 g | bagged |
| Comparative Example 2 | HFC134a | 10 kg | welded 11.9 liter | none | | |

| | Analyzed (ppm by wt.) | Immediately after production | After 1 month | After 1 year |
|---|---|---|---|---|
| Test Example 3 | moisture | 6 | 4 | 1 |
| | evaporation residue | 10 | 4 | 1 |
| | acid content | <0.1 | <0.1 | <0.1 |
| | appearance | colorless transparent | colorless transparent | colorless transparent |
| Comparative Example 2 | moisture | 5 | 7 | 25 |
| | evaporation residue | 8 | 10 | 23 |
| | acid content | <0.1 | <0.1 | 0.2 |
| | appearance | colorless transparent | colorless transparent | colorless transparent |

Test Example 4

A hundred samples of the present containerized refrigerants 20 of the embodiment shown in FIG. 3 were produced. The container 22 used was a three-piece tin-plate disposable container having a volume of 1,000 ml. The barrel section 26a and the bottom section 26b were joined by a staking process with the sealant 26c therebetween, the container body 26 and the lid member 27 were joined hermetically by a staking process with the packing material 28 of NBR therebetween, and the metal gauze 25 of 200 mesh was soldered to the undersurface of the lid member 27.

The container was filled with 1 kg of R-407C (HFC32/HFC125/HFC134a=23/25/52% by weight) as the refrigerant 23. Further, as the solid adsorbent 24, a granular molecular sieve ("MOLECULAR SIEVE XH-9", manufactured by Union Showa Co.) in an amount of 5 g not contained in the paper bag, and powdered activated coconut shell charcoal in an amount of 5 g confined in the paper bag were used. With respect to the thus-prepared containerized refrigerants, in the same way as in Test Example 1, changes in quality over time were followed. The results of the measurements are shown in Table 3.

Test Example 5

Test Example 4 was repeated, except that a usual three-piece 1,000-ml tin-plate disposable container similar to that shown in FIG. 3 but without using the metal gauze attached to the lid member was used, and in that instead of the activated coconut shell charcoal, 5 g of a granular molecular sieve ("MOLECULAR SIEVE XH-9", manufactured by Union Showa Co.) which was confined in the paper bag was used as a solid adsorbent, thereby producing 100 samples of the present containerized refrigerants. With respect to the thus-prepared containerized refrigerants, in the same way as in Test Example 1, changes in quality over time were followed. The results of the measurements are shown in Table 3.

The analysis by FT-IR found that the main component of the evaporation residue of the sample taken in the latter half was DOP.

Comparative Example 3

Using the three-piece 1,000-ml tin-plate disposable container without a metal gauze attached to the lid member of Test Example 5, Test Example 5 was repeated, except that the solid adsorbent was not used, thereby producing 100 containerized refrigerants of Comparative Example 3 in disposable containers.

The analysis by FT-IR found that the main component of the evaporation residue of the sample initially taken out was N-n-butylbenzenesulfonamide and the main component increased thereafter was DOP.

TABLE 3

| | Refrigerant | | | Adsorbant | | |
|---|---|---|---|---|---|---|
| | Type | Amount | Container | Type | Amount | Method |
| Test Example 4 | R-407C | 1 kg | 3-piece 1 liter with metal gauze | molecular sieve activated coconut shell charcoal | 5 g 5 g | only activated coconut charcoal placed in bag |
| Test Example 5 | R-407C | 1 kg | 3-piece 1 liter | molecular sieve | 5 g | bagged |
| Comparative Example 3 | R-407C | 1 kg | 3-piece 1 liter | none | | |

| | Analyzed (ppm by wt.) | Immediately after production | After 1 month | After 1 year |
|---|---|---|---|---|
| Test Example 4 | moisture | 10 | 7 | 1 |
| | evaporation residue | 12 | 3 | 1 |
| | acid content | <0.1 | <0.1 | <0.1 |
| | appearance | colorless transparent | colorless transparent | colorless transparent |
| Test Example 5 | moisture | 16 | 10 | 1 |
| | evaporation residue | 22 | 9 | 6 |
| | acid content | <0.1 | <0.1 | <0.1 |
| | appearance | colorless transparent | colorless transparent | colorless transparent |
| Comparative Example 3 | moisture | 18 | 21 | 35 |
| | evaporation residue | 23 | 25 | 44 |
| | acid content | <0.1 | <0.1 | 0.3 |
| | appearance | colorless transparent | colorless transparent | colorless transparent |

Test Example 6

Using the three-piece 1,000-ml tin-plate disposable container without a metal gauze attached to the lid member of Test Example 5, Test Example 5 was repeated, except that 1 kg of HCFC22 as the refrigerant was filled, thereby producing 100 samples of the present containerized refrigerants. With respect to the thus-prepared containerized refrigerants, in the same way as in Test Example 1, changes in quality over time were followed. The results of the measurements are shown in Table 4.

The analysis by FT-IR found that the main component of the evaporation residue of the sample taken in the latter half was DOP.

Test Example 7

The same three-piece tin-plate 1,000-ml disposable container having a metal gauze attached to the lid member as used in Test Example 4 was used and filled with 1 kg of HCFC22 as the refrigerant and a mixture of 5 g of a granular molecular sieve ("MOLECULAR SIEVE XH-9", manufactured by Union Showa Co.) and 5 g of powdered activated coconut shell charcoal as the solid adsorbent was confined in the paper bag, thereby producing 100 samples of the present containerized refrigerants according to Test Example 7. With respect to the thus-prepared containerized refrigerants, in the same way as in Test Example 1, changes in quality over time were followed. The results of the measurements are shown in Table 4.

Comparative Example 4

Test Example 6 was repeated, except that the same three-piece tin-plate 1,000-ml disposable container without a metal gauze attached to the lid member as used in Test Example 5 was used and no solid adsorbent was used, thereby producing 100 containerized refrigerants of Comparative Example 4 in disposable containers. With respect to the thus-prepared containerized refrigerants, in the same way as in Test Example 1, changes in quality over time were followed. The results of the measurements are shown in Table 4.

The analysis by FT-IR found that the main component of the evaporation residue of the sample initially taken out was N-n-butylbenzenesulfonamide and the main component increased thereafter was DOP.

Test Example 9

Test Example 8 was repeated, except that a mixture of 2 g of a granular molecular sieve ("MOLECULAR SIEVE XH-9", manufactured by Union Showa Co.) and 3 g of powdered activated coconut shell charcoal was confined in the paper bag to be used as the solid adsorbent, thereby producing 100 samples of the containerized refrigerants according to Test Example 9. With respect to the thus-prepared containerized refrigerants, in the same way as in Test Example 1, changes in quality over time were followed. The results of the measurements are shown in Table 5.

TABLE 4

| | Refrigerant | | | Adsorbent | | |
| --- | --- | --- | --- | --- | --- | --- |
| | Type | Amount | Container | Type | Amount | Method |
| Test Example 6 | HCFC22 | 1 kg | 3-piece liter 1 liter | molecular sieve | 5 g | bagged |
| Test Example 7 | HCFC22 | 1 kg | 3-piece 1 liter with metal gauze | mixture of: molecular sieve activated coconut shell charcoal | 5 g 5 g | bagged |
| Comparative Example 4 | HCFC22 | 1 kg | 3-piece 1 liter | none | | |

| | Analyzed (ppm by wt.) | Immediately after production | After 1 month | After 1 year |
| --- | --- | --- | --- | --- |
| Test Example 6 | moisture | 17 | 9 | 1 |
| | evaporation residue | 15 | 11 | 10 |
| | acid content | <0.1 | <0.1 | <0.1 |
| | appearance | colorless transparent | colorless transparent | colorless transparent |
| Test Example 7 | moisture | 20 | 7 | 1 |
| | evaporation residue | 35 | 16 | 1 |
| | acid content | <0.1 | <0.1 | <0.1 |
| | appearance | colorless transparent | colorless transparent | colorless transparent |
| Comparative Example 4 | moisture | 21 | 25 | 38 |
| | evaporation residue | 28 | 30 | 53 |
| | acid content | <0.1 | <0.1 | 0.3 |
| | appearance | colorless transparent | colorless transparent | colorless transparent |

Test Example 8

The same three-piece tin-plate disposable container without a metal gauze attached to the lid member as shown in Test Example 5 was used except that the capacity was 340 ml, the container was filled with 300 g of HCFC141b as a refrigerant, and 3 g of a granular molecular sieve ("MOLECULAR SIEVE XH-9", manufactured by Union Showa Co.) was confined in the paper bag to be used as the solid adsorbent, thereby producing 100 samples of the present containerized refrigerants according to Test Example 8. With respect to the thus-prepared containerized refrigerants, in the same way as in Test Example 1, changes in quality over time were followed. The results of the measurements are shown in Table 5.

Comparative Example 5

Test Example 8 was repeated, except that no solid adsorbent was used, thereby producing 100 containerized refrigerants of Comparative Example 5 in disposable containers. With respect to the thus-prepared containerized refrigerants, in the same way as in Test Example 1, changes in quality over time were followed. The results of the measurements are shown in Table 5.

The analysis by FT-IR found that the main component of the evaporation residue of the sample initially taken out was N-n-butylbenzenesulfonamide and the main component increased thereafter was DOP.

TABLE 5

| | Refrigerant | | | Adsorbent | | |
|---|---|---|---|---|---|---|
| | Type | Amount | Container | Type | Amount | Method |
| Test Example 8 | HCFC141b | 300 g | 3-piece 340 ml | molecular sieve | 3 g | bagged |
| Test Example 9 | HCFC141b | 300 g | 3-piece 340 ml | mixture of: molecular sieve activated coconut shell coconut | 2 g 3 g | agged |
| Comparative Example 5 | HCFC141b | 300 g | 3-piece 340 ml | none | | |

| | Analyzed (ppm by wt.) | Immediately after production | After 1 month | After 1 year |
|---|---|---|---|---|
| Test Example 8 | moisture | 13 | 5 | 1 |
| | evaporation residue | 23 | 12 | 10 |
| | acid content | <0.1 | <0.1 | <0.1 |
| | appearance | colorless transparent | colorless transparent | colorless transparent |
| Test Example 9 | moisture | 15 | 10 | 1 |
| | evaporation residue | 29 | 11 | 1 |
| | acid content | <0.1 | <0.1 | <0.1 |
| | appearance | colorless transparent | colorless transparent | colorless transparent |
| Comparative Example 5 | moisture | 25 | 39 | 82 |
| | evaporation residue | 17 | 20 | 94 |
| | acid content | <0.1 | <0.1 | 0.5 |
| | appearance | colorless transparent | colorless transparent | colorless transparent |

The foregoing results of measurements have demonstrated that according to the method for maintaining the purity of a refrigerant wherein the present containerized refrigerant in a disposable container is employed, the high purity of a refrigerant can be ensured relatively easily for a long period, which is never realized by conventional containerized refrigerants in disposable containers, and that the effect of the present invention is great.

The present invention is not limited to the above Examples and Test Examples and, for example, the refrigerant container may be not only of a two-piece type or a three-piece type but may also be of a four-piece type or the like, and the shape of the container may not be limited and may be subject to change according to the structure, the material, the volume, etc. Similarly, the type of the refrigerant component to be filled into the container, the type of the solid adsorbent to be contained in the container, the combination of the refrigerant component and the solid adsorbent, and the amounts of the refrigerant to be filled and of the solid adsorbent to be contained, and means for preventing spillage of the solid adsorbent, etc., are also not limited to those of the above Examples and Test Examples and can be chosen freely within the scope of the present invention.

What is claimed is:

1. A containerized refrigerant comprising a refrigerant in a disposable container, wherein the disposable container contains at least one solid adsorbent selected from the group consisting of a silica adsorbent, an alumina adsorbent, and a silica-alumina-type adsorbent having a framework structure comprising silica and alumina together in contact with the refrigerant, which consists of a hydrogen-containing fluorocarbon.

2. A containerized refrigerant in a disposable container as claimed in claim 1, wherein, in said refrigerant, moisture is maintained at 20 ppm by weight or less, acid content is maintained at 0.2 ppm by weight or less, and evaporation organic residue is maintained at 20 ppm by weight or less.

3. A containerized refrigerant in a disposable container as claimed in claim 1, wherein said refrigerant is selected from the group consisting of hydrofluorocarbons and hydrochlorofluorocarbons.

4. A containerized refrigerant in a disposable container as claimed in claim 1, wherein said solid adsorbent comprises at least one adsorbent selected from the group consisting of zeolites, silica gels, and activated aluminas.

5. A containerized refrigerant in a disposable container as claimed in claim 1, wherein said solid adsorbent is a synthetic zeolite.

6. A containerized refrigerant in a disposable container as claimed in claim 1, wherein said solid adsorbent comprises a carbon-type adsorbent together with at least one adsorbent selected from the group consisting of a silica adsorbent, an alumina adsorbent, and a silica-alumina-type adsorbent having a framework structure comprising silica and alumina.

7. A containerized refrigerant in a disposable container as claimed in claim 6, wherein said at least one adsorbent except said carbon-type adsorbent is selected from the group consisting of zeolites, silica gels, and activated aluminas.

8. A containerized refrigerant in a disposable container as claimed in claim 6, wherein said carbon-type adsorbent is selected from the group consisting of activated carbons and molecular sieving carbons.

9. A containerized refrigerant in a disposable container as claimed in claim 1, wherein said solid adsorbent comprises a synthetic zeolite and an activated carbon.

10. A containerized refrigerant in a disposable container as claimed in claim 1, wherein said solid adsorbent is confined in a refrigerant-permeable bag.

11. A containerized refrigerant in a disposable container as claimed in claim 1, wherein a refrigerant discharge port of said container is provided with a refrigerant-permeable filter.

12. A method for maintaining the purity of a refrigerant contained in a disposable container, comprising the step of containerizing at least one solid adsorbent selected from the group consisting of a silica adsorbent, an alumina adsorbent, and a silica-alumina-type adsorbent having a framework structure comprising silica and alumina together in contact with the refrigerant, which consists of a hydrogen-containing fluorocarbon in disposable container, thereby maintaining moisture at 20 ppm by weight or less, acid content at 0.2 ppm by weight or less, and evaporation organic residue at 20 ppm by weight or less in the refrigerant.

* * * * *